July 25, 1961  F. KOUBEK  2,993,424
PANORAMIC CAMERA

Filed Aug. 10, 1959  4 Sheets-Sheet 1

INVENTOR.
František Koubek
BY

July 25, 1961    F. KOUBEK    2,993,424
PANORAMIC CAMERA
Filed Aug. 10, 1959    4 Sheets-Sheet 2

INVENTOR.
František Koubek
BY

July 25, 1961 F. KOUBEK 2,993,424
PANORAMIC CAMERA
Filed Aug. 10, 1959 4 Sheets-Sheet 3

INVENTOR.
František Koubek
BY

July 25, 1961 F. KOUBEK 2,993,424
PANORAMIC CAMERA
Filed Aug. 10, 1959 4 Sheets-Sheet 4

INVENTOR.
František Koubek
BY
Richard Ernst
agt

United States Patent Office 2,993,424
Patented July 25, 1961

2,993,424
PANORAMIC CAMERA
František Koubek, Tritim, Czechoslovakia, assignor to Meopta Prerov, narodni podnik, Prerov, Czechoslovakia
Filed Aug. 10, 1959, Ser. No. 832,806
Claims priority, application Czechoslovakia Aug. 20, 1958
12 Claims. (Cl. 95—15)

The invention relates to a panoramic camera the objective of which swivels through an angle larger than 120° and the image is taken upon a fixed film.

Hitherto known cameras of this type can be divided into two classes: Hand operated cameras and cameras on tripods. Hand cameras are simpler and inexpensive in production but have a great number of regulating knobs difficult to operate while taking a picture and are not easy to keep in a fixed position and in the range of vision of the photographer, at the same time to maintain their horizontal position. With this known panoramic camera, the locally fixed film lies upon the inner surface of a cylinder the radius of which is equal to the focal distance of the objective.

Panoramic hand cameras are also known the objective cylinder of which is turned in one direction and the film is advanced for the next picture by means of a compound and complicated gear transmission from a spring mechanism or a motor (U.S.P. 2,717,542, U.S.P. 2,764,073, Swiss Pat. 308,913). Apparatus of this kind are heavy and difficult to handle.

The present invention simplifies panoramic cameras of this type in such a way that they can be more readily prepared for the picture and be easier to operate. Besides, they can be designed for wider films so the films obtained are easy to enlarge for the production of large size panoramic pictures, particularly for exhibitions. While taking a picture, one is able to hold the panoramic camera, by means of two handles, quietly in eye level, it being possible to check the horizontal position of the camera in the dioptric view finder. The horizontal adjustment is very important for the taking of panoramic pictures considering the fact that inaccurate positions cause undesirable distortions of the pictures. The present invention is characterized in that it consists of an objective and a shutter, both of them placed in an objective cylinder which is rotatable on lateral pins in the center of the camera housing which has the shape of a horseshoe and is provided on either side, with independently movable wing handles hinged on axes parallel to the axis of the objective cylinder and to the axes of the film spools. The connecting line of the two handles approximately intersects the center of gravity of the apparatus. For storing the camera, both handles can be tilted to the front side of the housing. The invention is further characterized by a wide-angle view-finder and a clinometer, located upon the upper surface of the housing, the image of the clinometer scale being transferred, by optical means, to the field of view of the finder so that it is possible to adjust the position of the apparatus in the two horizontal directions while observing the object to be taken.

Two embodiments of the invention are illustrated, by way of example, in the accompanying drawings.

Figure 1:
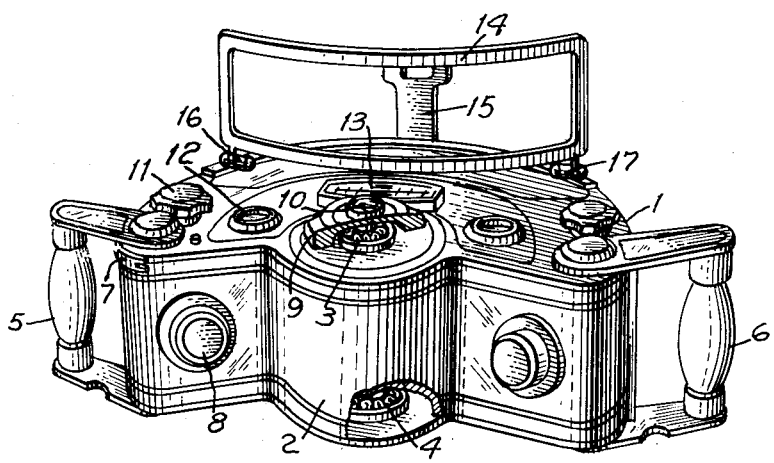
FIG. 1 is a perspective view of one embodiment of a panoramic camera, in a position ready for shooting.
Figure 2:
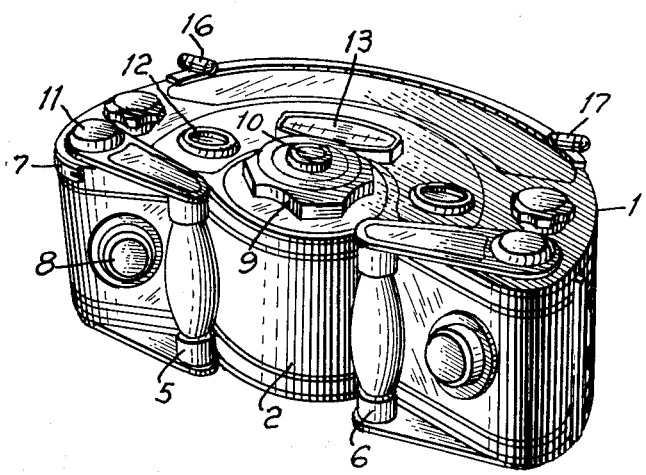
FIG. 2 is a perspective view of the same embodiment with the handles and the view finder tilted.

The panoramic camera represented in FIG. 1 consists of a housing 1 in the shape of a horseshoe, in the center of which there is the objective cylinder 2 pivoted on lateral pins and ball bearings 3 and 4. On both sides of the housing there are wing handles 5, 6 swivelling independently of one another, and a trigger 7 which controls the device for swivelling the objective cylinder 2. A knob 8 located on the front surface of the panoramic camera serves for regulating the swivelling speed, i.e. the time of exposure. The knob 9 located on the upper housing surface, upon the pin of the objective cylinder 2, is used for winding up the swivelling device of the objective cylinder. A coaxially arranged knob 10 serves for setting the iris diaphragm of the objective (not shown). The knob 11 serves for advancing the photo-sensitive film by the length of one panoramic image. The number of pictures taken is indicated by the counter 12.

Figure 3:
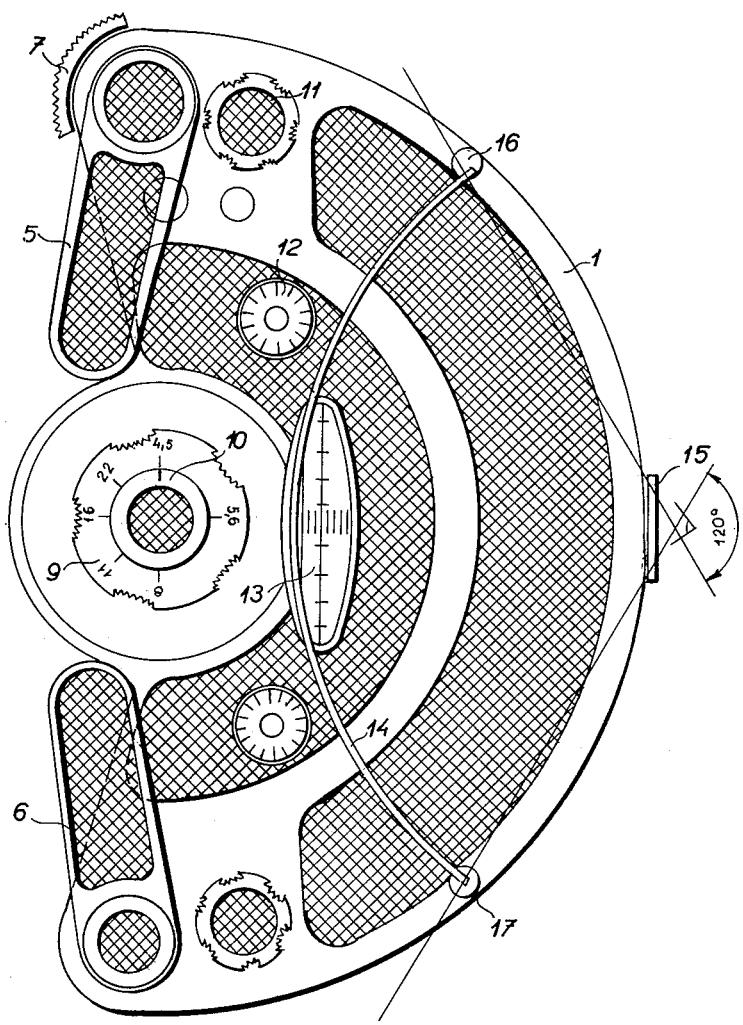
FIG. 3 is a view of the upper surface of the panoramic camera housing with the view-finder in its working position.
Figure 4:
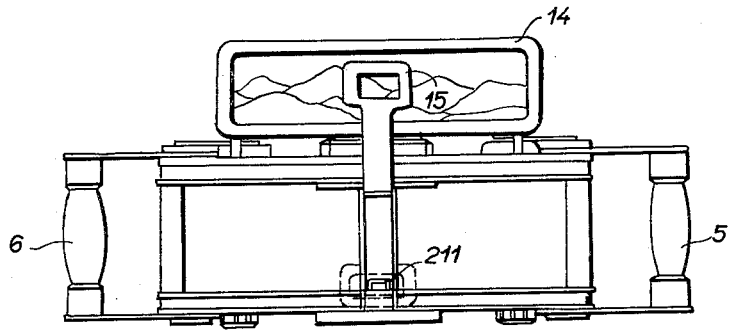
FIG. 4 is a view of the rear wall of the panoramic camera housing showing the frame of the view finder and of the diopter in the working position and indicating a portion of the object to be taken.
Figure 5:
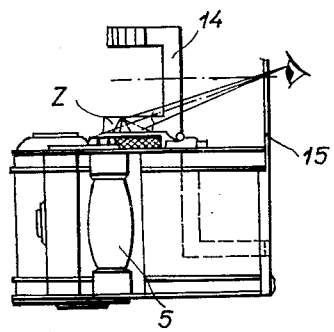
FIG. 5 is a lateral view of the camera with view-finder and a mirror for projecting the water level image on the view-field of the view-finder.
Figure 6:
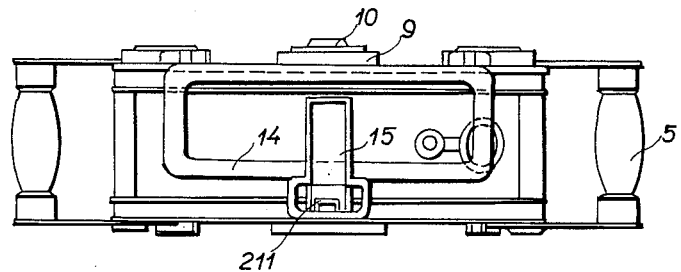
FIG. 6 is a view of the rear wall of the camera housing with the frame of the view-finder and diopter tilted.

An important part of the panoramic camera is played by the clinometer or level 13 having the shape of a small box. It is placed upon the upper surface of the housing 1 (FIGS. 3 and 5). Behind the clinometer there is the dioptric view finder in the shape of an arched frame 14, a diopter 15 and a mirror Z. The box-type level 13 and the view-finder are so arranged that, in their field of view, there appears a portion of the object to be taken together with the clinometer indications seen in the mirror Z, so as to enable a perfect horizontal adjustment of the apparatus to be carried out. The box-type level 13 is fitted with two scales at right angles to one another, as shown in FIG. 3. This level can be also used as reversed level when taking over-head shots and observing the level from the bottom towards the top.

Figures 7, 8:
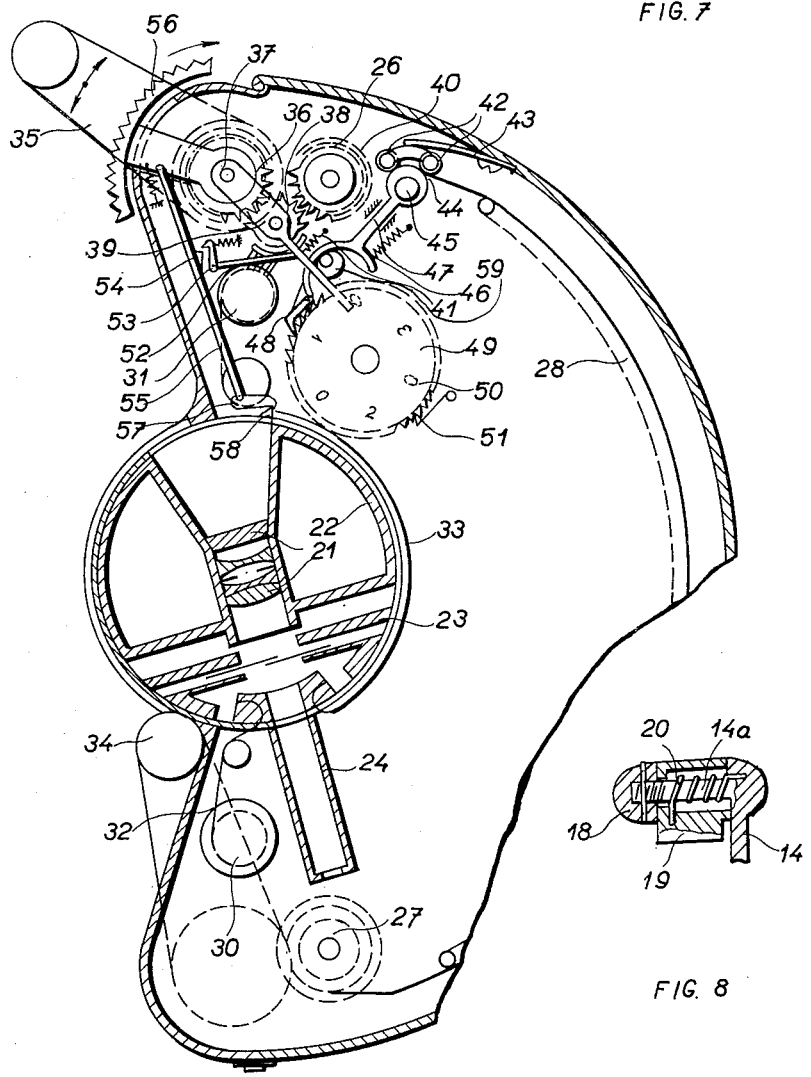
FIG. 7 is a view of another embodiment of the panoramic camera and of the mechanism for advancing the film by the length of image, combined with a device for the prevention of double exposures and with the shot counter.
FIG. 8 is a sectional view—showing details of a hinge of the tiltable finder frame.

The arched view-finder frame 14 can be tilted due to hinges 16 and 17 a sectional view of which is shown in FIG. 8. Pins 14a forming part of the frame 14 are located in grooves 19 of the housing 1 and are secured by caps 18. In the cavity of each hinge there is a coil spring 20 placed upon the pin 14a of the frame 14. The two springs of the two hinges 16 and 17 automatically keep the frame 14 in its erected working position. When tilted down, the frame 14 and diopter 15 are retained, by a catcher 211, close to the rear wall of the housing 1. The shape of the arched finder frame 14 corresponds to the radius of curvature of the housing 1. Thus, in their tilted down position, all parts of the view-finder are preserved from being damaged. When looking above the diopter 15, the erected frame 14 limits with its bow the portion of the object to be taken at the size of the panoramic picture taken by the apparatus.

According to the second embodiment of the panoramic camera (FIG. 7), the objective 21 is located inside the objective cylinder 22. Behind the objective 21, there is the photographic two-sector shutter 23 controlled by the device for swivelling the objective cylinder 22 which is fitted with a light tunnel 24 and can be deviated by an angle of, preferably, more than 120°. Inside the camera housing 25 there are film spools 26 and 27, and the sensitive film 28 is advanced along an arched path 29. A spring mechanism installed inside hollow rollers 30 and 31 and flexible types 32 and 33 serve for carrying out the rotation of the objective cylinder 22. FIG. 7 also shows the mechanism for advancing the sensitive film 28 by the length of one image. It works in connection with a device which serves for the prevention of double exposures, i.e. with the device for locking the manual release.

Hinged on either side of the housing 25 of the panoramic camera are wing handles 34 and 35. A gear wheel 36 is connected to the handle 35 by means of a coupling which works in one direction only (not shown). The handle 35 and the gear wheel 36 are pivoted on the pin 37 and engage a gear wheel 38 fitted on the fork 39. The gear 38 is pushed into engagement with a gear 40 by a coil spring 41. The gear 40 is connected with the winding spool 26, of the sensitive film 28. The film is pressed to a measuring roller 44 by the action of rollers 42 fitted upon a spring 43 which is fixed to the housing 25. The measuring roller 44 is provided with a cam 45 to which a rod 47 with pawl 48 is pressed by the coil spring 46. By moving to and fro the rod 47 with its pawl 48, the counter 49 is rotated, which is fitted with a ratchet wheel and a stop 50, a pawl 51 preventing it from turning back. As soon as the sensitive film 28 is advanced by the length of an image, i.e. when the counter has been turned through a certain angle, the stop 50 causes the extended lever of the fork 39 to deviate so as to disengage the gear wheels 38 and 40. By displacing the rod 52, the two-arm catcher 53 is deviated and disengages the tooth 54 of the rod 55 which is linked to the manual release 56 and, with its other end, is connected to a catching lever 57 which engages the tooth 58 fitted upon the objective cylinder 22. By this, the device for swivelling the objective cylinder is unlocked and the manual release 56 can be displaced in the direction of the arrow for taking a picture. In order to secure the mechanism manually against undesirable manipulations, one operates the eccentric 59 by means of a knob located upon the upper surface of the camera housing.

By turning the objective cylinder 22 in the reverse direction, the spring mechanism is wound up and the connection between the extended lever of the fork 39 and the stop 50 is unlocked by means of a special device (not shown). Thereupon the mechanism is ready for rewinding the film 28 upon the film spool 26 by a length of the image, when moving the handle 35 to and fro.

The second handle 34 may be used for various purposes, for rewinding the sensitive film 28 into its initial cassette which is especially advantageous if using cinema films (the special rewinding device necessary for the purpose is not shown in the drawing). In another instance, the handle 34 can be used for winding up the swivelling device of the objective cylinder.

The invention is not limited to the described embodiments which may undergo various constructional changes without changing the substance of the invention. It is, for instance, possible to make an advantageous use of a telescopic view-finder with wide-angle objective, into the view-field of which the image of the clinometer is transferred by optical means. The device for the prevention of double exposures and the mechanism for measuring the length of the image when advancing the film, may be designed in different ways.

The described embodiments are particularly suitable for those panoramic cameras the picture ratio of which is larger than 1:3, preferably 1:4, while the focal distance of the objective is about twice the height of the image. Appropriate dimensions are 55 x 235 mm. for the image and 105 mm. for the focal distance, as the character of pictures taken by a telescopic objective is particularly preferable for taking panoramic pictures of remote objects.

I claim:

1. A panoramic camera comprising a generally horseshoe-shaped housing having an arcuate film support therein, a cylinder mounted in said housing between the ends of the latter and being rotatable about its central axis which is concentric with said arcuate film support, said cylinder having a light tunnel extending diametrically therethrough and a lens and shutter interposed in said tunnel, film supply and take-up rolls rotatably mounted in said housing adjacent the opposite ends thereof so that film can be run from said supply roll along said film support to said take-up roll, spring actuated means urging said cylinder to turn in one direction between two extreme positions so that a panoramic image is projected through said lens and shutter onto the film on said film support, two handles, means mounting said handles on the opposite ends of said housing for swinging relative to the latter about axes which are parallel to said axis of the cylinder, latch means operative to hold said cylinder in one of said extreme positions against the urging of said spring actuated means, manually actuable release means operative to release said latch means and thereby permit turning of said cylinder by said spring actuated means, safety means engageable with said release means to prevent manual actuation of the latter, a drive mechanism actuated by oscillation of one of said handles and operative to turn said take-up roll for advancing the film along said film support, and means disengaging said safety means from said release means following the advancement of a predetermined length of film by said take-up roll so that said release means can only then be manually actuated, thereby preventing double exposures.

2. A panoramic camera as in claim 1; wherein the center of gravity of the camera lies approximately on a line extending through the swinging axes of the handles.

3. A panoramic camera as in claim 1; further comprising a wide angle view-finder and a clinometer mounted on top of said housing and having scales at right angles to each other, and optical means projecting an image of said clinometer into the field of view of said view-finder.

4. A panoramic camera as in claim 3; wherein said view-finder includes an arched rectangular frame disposable in an upstanding position adjacent the front of said housing, and a diopter disposable in an upstanding position at the back of said housing.

5. A panoramic camera as in claim 4; wherein said rectangular frame and diopter are swingably mounted to move from said upstanding positions to stored positions against the back surface of said housing, and the curvature of said arched rectangular frame corresponds to that of said back surface so that said frame fits closely against said back surface in its stored position; and further comprising spring means urging said frame and diopter to said upstanding positions.

6. A panoramic camera as in claim 1; wherein said shutter is of the sector-type.

7. A panoramic camera as in claim 1; wherein said lens is mounted adjacent the center of said light tunnel so that the forward portion of the latter forms a sunshield for the lens.

8. A panoramic camera as in claim 1; wherein said spring actuated means urging the cylinder to turn includes at least one spring-urged roller rotatably mounted in said housing adjacent said cylinder and with its axis parallel to said axis of the latter, and a flexible ribbon wound on said roller and connected to the surface of said cylinder to turn the latter in response to spring-urged rotation of said roller.

9. A panoramic camera as in claim 1; wherein said drive mechanism includes a first gear rotatable with said one handle during swinging of the latter in one direction, a second gear secured to said take-up roll and a third gear meshing with said first gear and yieldably urged into meshing engagement with said second gear; and wherein said means disengaging said safety means from said release means also disengages said third gear from said second gear to halt further advancement of the film.

10. A panoramic camera as in claim 9; wherein said means disengaging the safety means from the release means and disengaging the third gear from the second gear includes a measuring roll in contact with the film so as to be rotated by the latter, a counter disc turned in response to rotation of said measuring roll, a movable support carrying said third gear, and abutment means on said counter disc engageable with said movable support to displace the latter when said counter disc has been turned to an extent corresponding to said predetermined advancement of the film.

11. A panoramic camera as in claim 10; wherein said latch means includes a latch lever pivotally mounted adjacent said cylinder, an abutment on said cylinder engageable by said latch lever, a rod extending from said latch lever toward said one handle, and an actuating member movably mounted on said housing adjacent said one handle and connected to said rod.

12. A panoramic camera as in claim 11; wherein said safety means includes a stop on said rod, a safety catch normally engaging said stop to prevent movement of said rod by said actuating member, and connecting means between said movable support carrying the third gear and said safety catch to withdraw the latter from engagement with said stop in response to displacement of said movable support by abutment means on the counter disc.

References Cited in the file of this patent

UNITED STATES PATENTS

| | | |
|---|---|---|
| 778,394 | Angsten | Dec. 27, 1904 |
| 1,645,923 | Ohlau | Oct. 18, 1927 |
| 2,129,959 | Pollock | Sept. 13, 1938 |
| 2,764,073 | Liu | Sept. 25, 1956 |